(12) United States Patent
Nakabayashi (10) Patent No.: US 8,270,080 B2
(45) Date of Patent: Sep. 18, 2012

(54) DIFFRACTIVE OPTICAL ELEMENT AND METHOD FOR MANUFACTURING SAME

(75) Inventor: Masaaki Nakabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 12/631,657

(22) Filed: Dec. 4, 2009

(65) Prior Publication Data

US 2010/0142053 A1    Jun. 10, 2010

(30) Foreign Application Priority Data

Dec. 10, 2008 (JP) ................................. 2008-314210
Oct. 16, 2009 (JP) ................................. 2009-239394

(51) Int. Cl.
*G02B 5/18* (2006.01)

(52) U.S. Cl. .................. 359/571; 359/569; 359/573

(58) Field of Classification Search ............... 359/565, 359/569, 576, 571, 573, 574, 575; 522/81
See application file for complete search history.

(56) References Cited

U.S. PATENT DOCUMENTS

| 5,982,545 | A | 11/1999 | Su |
| 6,759,471 | B1 | 7/2004 | Ukuda |
| 7,256,939 | B2 * | 8/2007 | Tanaka ........................... 359/576 |
| 2008/0161444 | A1 * | 7/2008 | Hayashi et al. .................. 522/81 |
| 2009/0190224 | A1 * | 7/2009 | Iwasa ............................. 359/576 |

FOREIGN PATENT DOCUMENTS

| CN | 101231357 A | 7/2008 |
| WO | 2008/082168 A1 | 7/2008 |

* cited by examiner

*Primary Examiner* — Audrey Y Chang
(74) *Attorney, Agent, or Firm* — Canon U.S.A., Inc. IP Division

(57) ABSTRACT

An element includes a first resin layer and a second resin layer disposed between a first glass lens substrate and a second glass lens substrate, a boundary surface between the first resin layer and the second resin layer having a diffraction grating shape including a plurality of inclined surfaces and wall surfaces. The second resin layer is composed of a fluororesin in which fine metal oxide particles are dispersed. Since a refractive index distribution easily occurs in this material during curing by application of ultraviolet light, by applying ultraviolet light substantially perpendicular to the inclined surfaces of the diffraction grating shape, a refractive index distribution is formed in the thickness direction perpendicularly to the inclined surfaces.

6 Claims, 7 Drawing Sheets

ULTRAVIOLET LIGHT

DIFFRACTIVE OPTICAL ELEMENT AND METHOD FOR MANUFACTURING SAME

BACKGROUND OF THE INVENTION

1. Field of the Invention

The present invention relates to a diffractive optical element used for an optical system or the like and a method for manufacturing the diffractive optical element.

2. Description of the Related Art

As one of the methods for correcting chromatic aberration in an optical system, a method has been known in which two lenses composed of glass materials that differ in dispersion properties are combined. Meanwhile, another method has been known in which a diffractive optical element having a diffraction effect is provided on a lens surface to thereby reduce chromatic aberration. This method uses a physical phenomenon where the refractive and diffractive surfaces in an optical system exhibit chromatic aberration outputs in opposite directions with respect to a light ray having a given reference wavelength.

Furthermore, in order to adjust refractive indices and Abbe numbers of diffractive optical elements, U.S. Pat. No. 6,759,471 (Patent Document 1) discloses a composite material in which fine particles composed of a transparent conductive metal oxide, such as ITO, ATO, $SnO_2$, or ZnO, are mixed/dispersed in a UV curable binder resin. Furthermore, Patent Document 1 also discloses a laminated diffractive optical element formed by laminating two resin layers. In an optical system having a chromatic aberration correction effect, such a laminated diffractive optical element can greatly reduce diffraction efficiency in the vicinity of a designed order in the wavelength region to be used.

In recent years, when a diffractive optical element is used as a camera lens, nano-level shape accuracy of a diffraction grating may be required. However, in the case where a photo-curable resin is used, since the resin starts to react from the points irradiated with ultraviolet light or the like, a difference in density occurs in the cured resin due to the difference in the curing rate, resulting in a non-uniform refractive index distribution.

SUMMARY OF THE INVENTION

According to the present invention, there is provided an element which includes a glass lens substrate and a resin layer composed of a photo-curable resin disposed on the glass lens substrate, the resin layer having a diffraction grating shape including a plurality of inclined surfaces and wall surfaces. The refractive index of the resin layer varies depending on a thickness of the resin layer, and the variation of the refractive index is based on light that applies substantially perpendicular to the inclined surfaces.

Further features of the present invention will become apparent from the following description of exemplary embodiments with reference to the attached drawings.

DESCRIPTION OF THE EMBODIMENTS

First, the basic principle in carrying out the present invention will be described. As a result of diligent study, the present inventor has found that, when a photo-curable resin is cured, due to the difference in the curing rate, a non-uniform refractive index distribution occurs in the resin. This results from the fact that due to flow of the uncured resin during curing, a difference in the density of the resin occurs. Furthermore, the non-uniform refractive index distribution is more marked in the case of a resin in which fine particles are dispersed. The reason for this is that as the uncured resin flows during curing, fine particles also flow, which causes a difference in the content of fine particles. As a result, the content of fine particles is low in a portion which cures quickly, and the content of fine particles is high in a portion which cures slowly. In particular, in the case of a fluororesin, it has been confirmed that, since the viscosity is lower than other photo-curable resins, the flowability is higher, and the non-uniform refractive index distribution is still more marked.

Figure 1A:
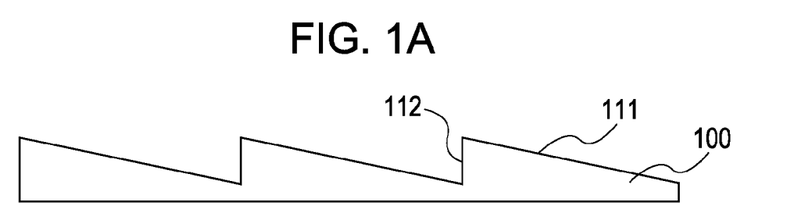
FIGS. 1A to 1D are each a cross-sectional view of a diffraction grating for illustrating the principle of the present invention.

FIG. 1A is a cross-sectional view of a commonly-used diffraction grating 100. Inclined surfaces 111 which are optically effective surfaces and wall surfaces 112 which define the height of the grating constitute a diffraction grating shape. In a diffractive optical element, when the diffraction grating 100 is composed of a photo-curable resin material in which fine particles of a metal oxide are dispersed, as described above, due to the difference in the curing rate, a non-uniform refractive index distribution occurs in the cured diffraction grating.

Figure 1B:
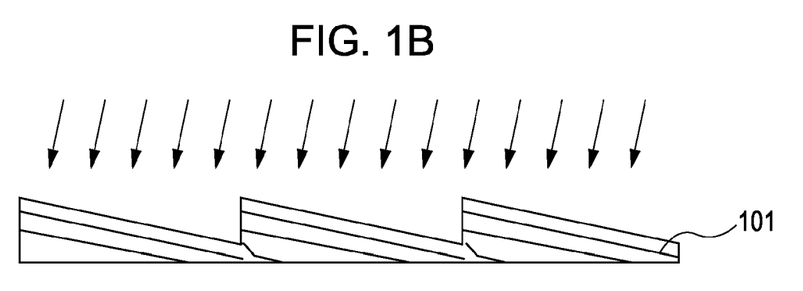
Figure 1C:
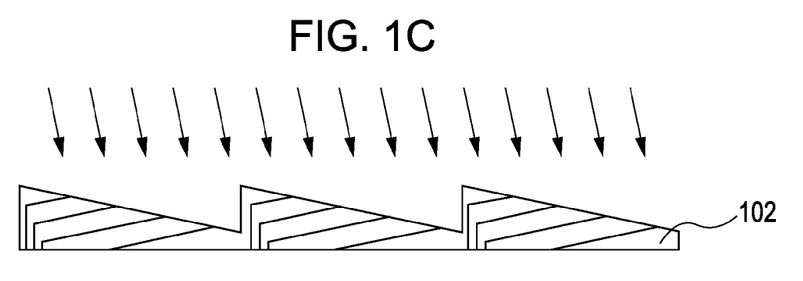
Figure 1D:
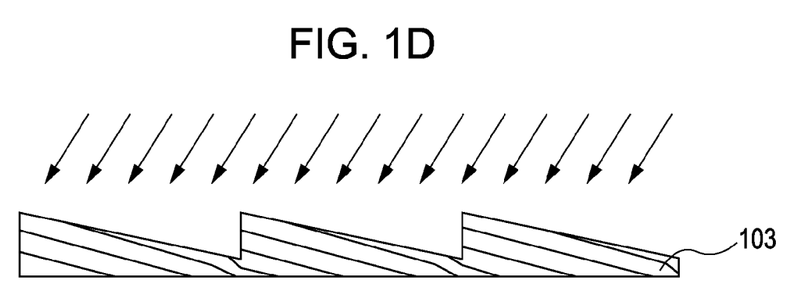

FIGS. 1B to 1D are each a schematic view showing the refractive index distribution state, in which the light application direction to the diffraction grating is indicated by arrows. FIG. 1B shows a case where light is applied substantially perpendicularly to inclined surfaces 111 of a diffraction grating 101. In this case, in the refractive index distribution, the refractive index gradually varies in a direction perpendicular to the inclined surfaces 111. Furthermore, FIG. 1C shows a case where light is applied to each inclined surface 111 of a diffraction grating 102 in a direction deviated from the direction perpendicular to the inclined surface 111 toward the wall surface 112. In this case, in the refractive index distribution, the refractive index gradually varies from the apex formed by the inclined surface 111 and the wall surface 112 in the inclined surface 111 direction and in a direction perpendicular to the wall surface 112. That is, a refractive index distribution is formed such that the refractive index varies from left to right in each groove of the diffraction grating in FIG. 1C. Furthermore, FIG. 1D shows a case where light is applied to each inclined surface 111 of a diffraction grating 103 in a direction deviated from the direction perpendicular to the inclined surface 111 toward the opposite side of the wall surface 12. In this case, in the refractive index distribution, the refractive index gradually varies from right to left in each groove of the diffraction grating in FIG. 1D.

As curing proceeds, the flowability of the photo-curable resin material decreases. Therefore, the variation in the refractive index decreases as the distance from the light source increases. In reality, when irradiated light is ultraviolet light or the like, the light is refracted due to the variation in the internal refractive index of the diffraction grating 103. Here, in order to facilitate the description, it is assumed that such refraction does not occur.

Figure 2A:
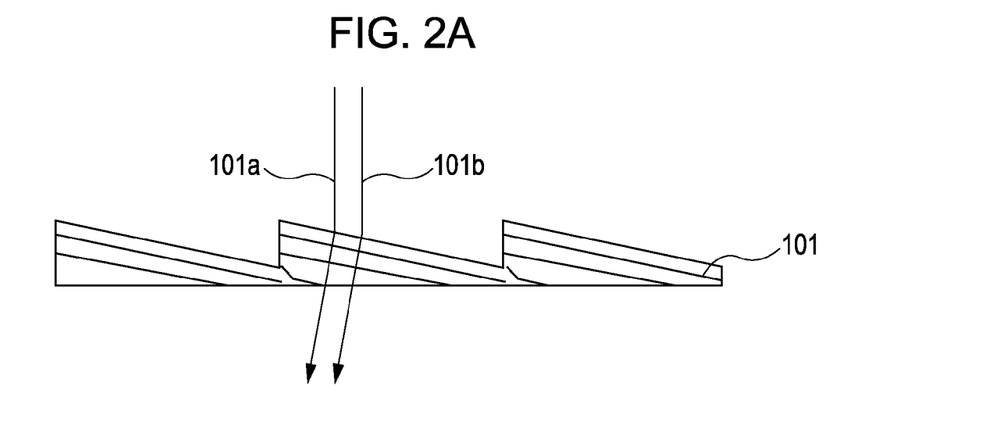
FIGS. 2A to 2C are each a cross-sectional view of a diffraction grating for illustrating the principle of the present invention.
Figure 2B:
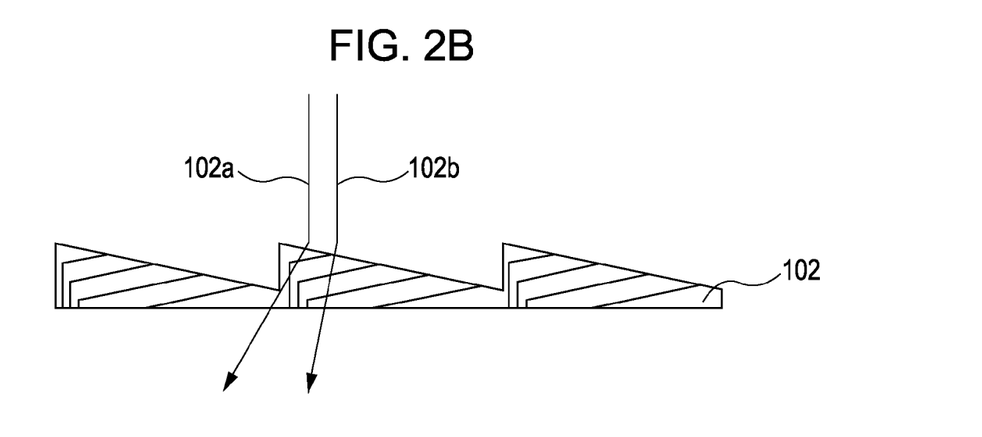
Figure 2C:
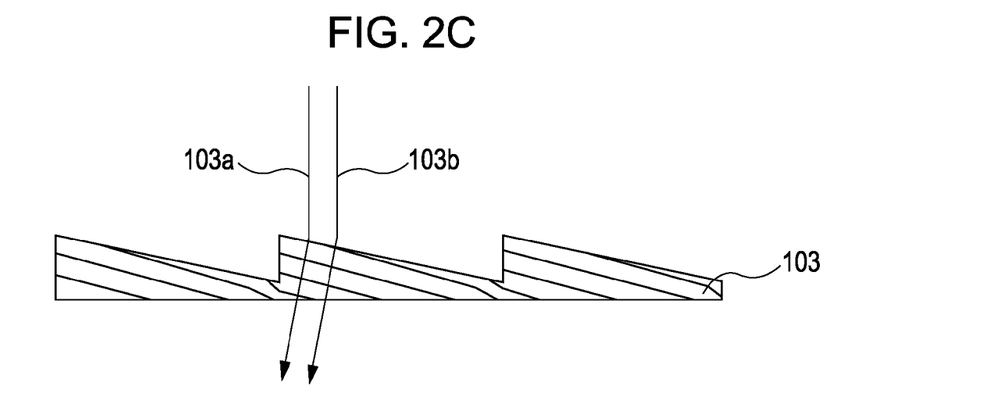

FIGS. 2A to 2C each show light paths when one of the diffraction gratings 101 to 103 shown in FIGS. 1B to 1D is incorporated into an optical system including a plurality of lenses.

FIG. 2A shows light paths when the diffraction grating shown in FIG. 1B is used. As is evident from FIG. 2A, parallel incident light rays 101a and 101b pass through regions having the same refractive index distribution. Consequently, the incident light rays 101a and 101b which have passed through the diffraction grating are refracted substantially in the same manner and emitted while maintaining the parallel state. Consequently, by setting optical design values in consideration of the refracted value in advance, it is possible to realize high diffraction efficiency.

FIG. 2B shows light paths when the diffraction grating shown in FIG. 1C is used. As is evident from FIG. 2B, parallel incident light rays 102a and 102b pass through regions having completely different refractive index distributions. In particular, due to the difference in refractive index from the wall surface 112, the incident light rays 102a and 102b which have passed through the diffraction grating are emitted in completely different directions. In reality, it is very difficult to determine how the incident light ray 102a is refracted, and the optical design values cannot be corrected, resulting in a decrease in diffraction efficiency.

FIG. 2C shows light paths when the diffraction grating shown in FIG. 1D is used. As is evident from FIG. 2C, parallel incident light rays 103a and 103b pass through regions having different refractive index distributions. However, the difference in the refractive index distribution is slight, and the incident light rays 103a and 103b are refracted substantially in the same manner and emitted while maintaining the parallel state. Consequently, as in FIG. 2A, by setting optical design values in consideration of the refracted values in advance, it is possible to realize high diffraction efficiency.

On the basis of what has been described above, as the diffraction grating actually formed, the diffraction grating 101 shown in FIGS. 1B and 2A may mostly be chosen. With respect to the diffraction grating 103 shown in FIGS. 1D and 2C, although being inferior to the diffraction grating 101, the refractive index distribution can be limited to a range that can be sufficiently handled through optical design. However, in the case of the diffraction grating 102 shown in FIGS. 1C and 2B, it may be difficult to determine the path of the incident light ray 102a, and diffraction efficiency is decreased. Consequently, in one embodiment, the incident angle of ultraviolet light to be applied is 90 degrees with respect to the inclined surfaces 111, and the incident angle should be deviated from the direction perpendicular to each inclined surface 111 toward the thinner portion of the resin layer in the inclined surface.

Figure 3:
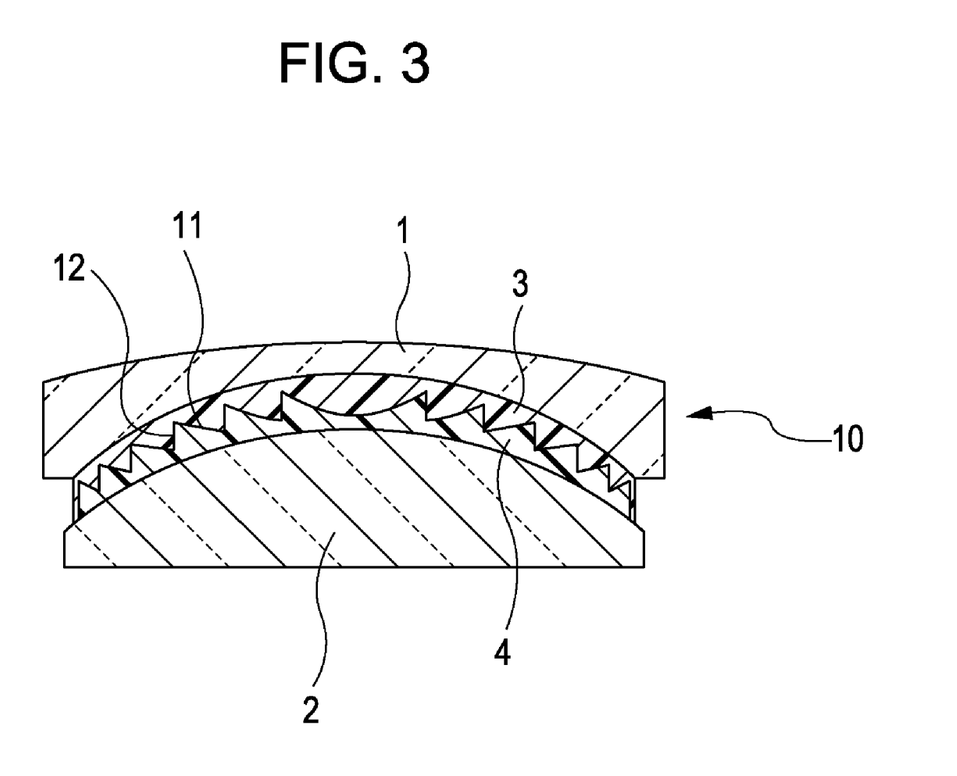
FIG. 3 is a cross-sectional view of a diffractive optical element according to the present invention.

FIG. 3 is a cross-sectional view showing a laminated diffractive optical element 10 according to a first embodiment. Reference numeral 1 represents a meniscus-shaped first glass lens substrate, and reference numeral 2 represents a convex second glass lens substrate. A first resin layer 3 and a second resin layer 4 are disposed, in that order from the first glass lens substrate 1 side, between the first and second glass lens substrates 1 and 2. The first resin layer 3 and the second resin layer 4 are each composed of a photo-curable resin which is cured by light, such as ultraviolet light. Fine metal particles are dispersed in the second resin layer 4. The boundary surface between the first resin layer 3 and the second resin layer 4 has a diffraction grating shape with a saw-toothed cross-section. Because of the boundary surface having the diffraction grating shape, the laminated diffractive optical element 10 exhibits a diffraction effect. The boundary surface having the diffraction grating shape includes inclined surfaces 11 which are optically effective surfaces and wall surfaces 12 which define the height of the grating.

In the laminated diffractive optical element 10 shown in FIG. 3, inclination angles of the inclined surfaces 11 are not constant. The inclination angles gradually vary from the center toward the periphery of the laminated diffractive optical element 10. In ordinary optical design, when the inclined surfaces 11 are connected to each other, an aspherical shape is formed. Therefore, the inclination angles of the inclined surfaces 11 become gentler with increasing distance from the center toward the periphery of the laminated diffractive optical element 10.

Figure 4A:
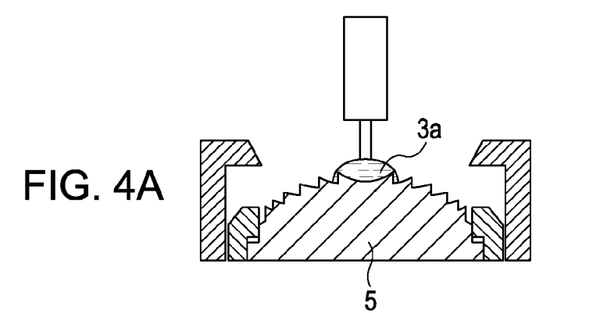
FIGS. 4A to 4E are cross-sectional views showing a method for forming a diffractive optical element according to the present invention.
Figure 4B:
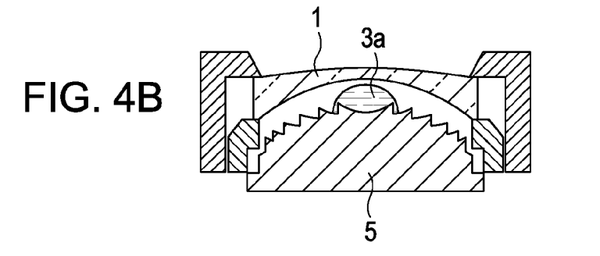
Figure 4C:
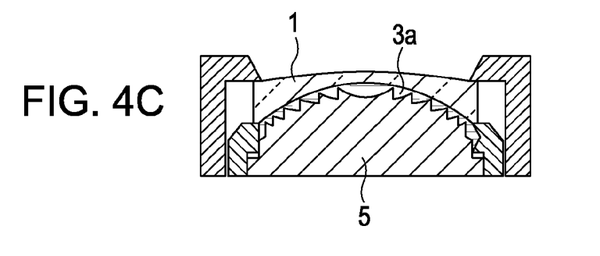

Next, a method for manufacturing a laminated diffractive optical element 10 will be described with reference to FIGS. 4A and 5D. First, as shown in FIG. 4A, an appropriate amount of a photo-curable resin material 3a for forming a first resin layer 3 is added dropwise onto a molding die obtained by machining a plating layer of NiP or the like. The photo-curable resin material 3a is incorporated with a reaction initiator so that photo-curing can be initiated. Next, as shown in FIG. 4B, a first glass lens substrate 1 is arranged so as to cover the photo-curable resin material 3a. Next, as shown in FIG. 4C, by gradually lowering the glass lens substrate 1, the dropwise added photo-curable resin material 3a and the glass lens substrate 1 are brought into contact with each other, and a space between the glass lens substrate 1 and the molding die 5 is filled with the photo-curable resin material 3a such that bubbles are not included therein. Incidentally, in order to improve adhesion between the glass lens substrate 1 and the photo-curable resin material 3a in advance, a silane coupling agent is applied by a spinner onto the surface of the glass lens substrate 1, followed by drying with an oven.

Figure 4D:
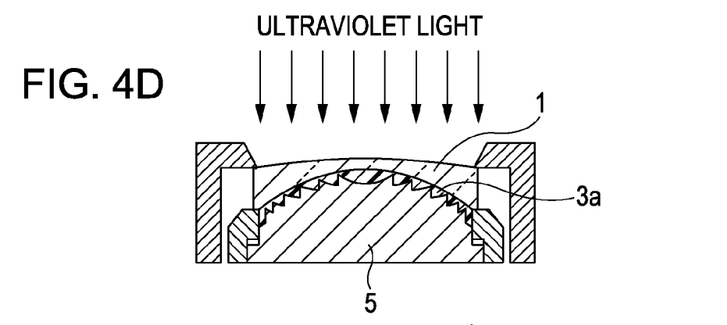
Figure 4E:
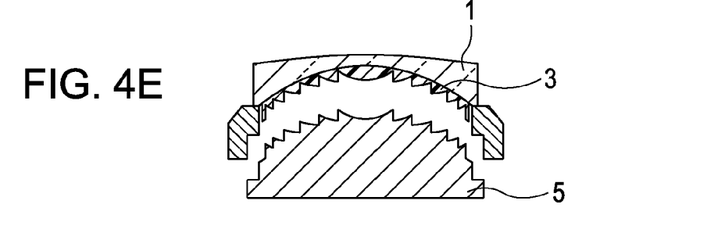

Next, as shown in FIG. 4D, the photo-curable resin material 3a is cured and integrated with the first glass lens substrate 1 by applying ultraviolet light through the first glass lens substrate 1. Next, as shown in FIG. 4E, the first glass lens substrate 1 and the first resin layer 3, which have been integrated together, are released from the molding die 5 by lifting the peripheral portion of the first glass lens substrate 1. Thereby, a diffractive optical element including the first glass lens substrate 1 and the resin layer 3 is obtained.

Figure 5A:
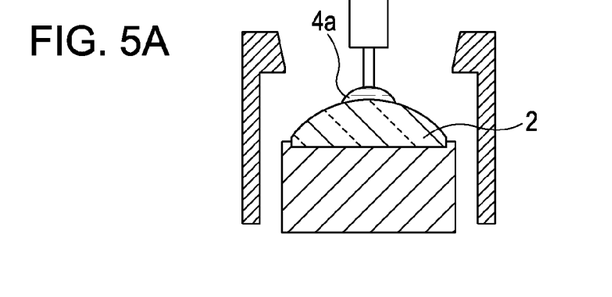
FIGS. 5A to 5D are cross-sectional views showing a method for forming a diffractive optical element according to the present invention.
Figure 5B:
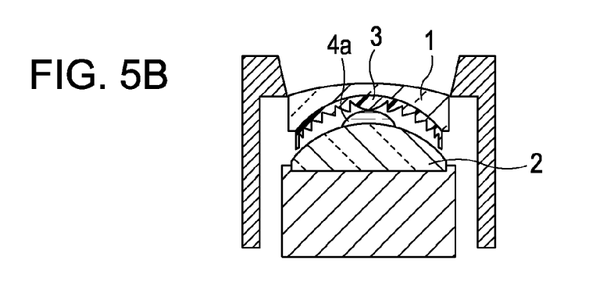
Figure 5C:
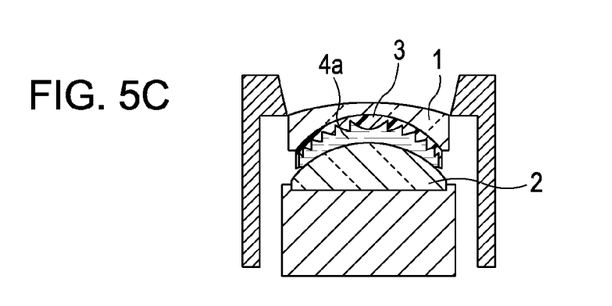

In the case of a laminated diffractive optical element including a plurality of resin layers, the following steps are further carried out after the steps shown in FIG. 4A to 4E. As shown in FIG. 5A, a resin material 4a for forming a second resin layer 4 is added dropwise onto a second glass lens substrate 2. Next, as shown in FIG. 5B, the first glass lens substrate 1 and the first resin layer 3, which have been integrated together and formed in the step shown in FIG. 4E, are arranged, with the first resin layer 3 being directed downward, over the photo-curable resin material 4a. The photo-curable resin material 4a is prepared by dispersing fine metal oxide particles in a fluororesin material, and is incorporated with a reaction initiator so that photo-curing can be initiated. Next, as shown in FIG. 5C, by gradually lowering the first glass lens substrate 1, the dropwise added photo-curable resin material 4a and the first resin layer 3 are brought into contact with each other, and a space between the second glass lens substrate 2 and the first resin layer 3 is filled with the photo-curable resin material 4a such that bubbles are not included therein.

Figure 5D:
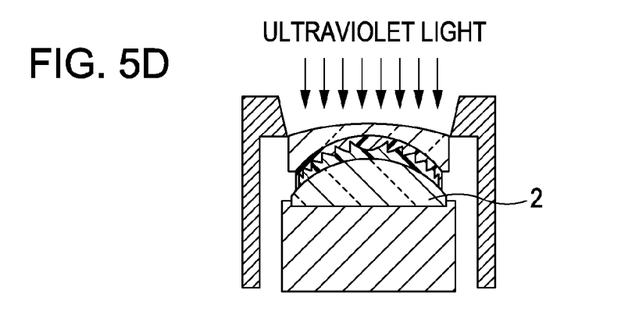

Next, as shown in FIG. 5D, by applying ultraviolet light through the first glass lens substrate 1, the photo-curable resin material 4a is cured, and the first glass lens substrate 1, the first resin layer 3, the second resin layer 4, and the second glass lens substrate 2 are integrated together. Then, a sealing material is applied to the peripheral portions of the glass lens substrates to seal the inside. Thereby, a laminated diffractive optical element 10 shown in FIG. 3 is obtained.

As described above, the inclination angles of the inclined surfaces 11 become gentler with increasing distance from the center toward the periphery of the laminated diffractive optical element 10. Consequently, if ultraviolet light is applied in a given direction in the steps shown in FIGS. 4D and 5D, there is an increased possibility that, in any of the inclined surfaces 11, the refractive index distribution as the one shown in FIGS. 1C and 2B may occur.

Figure 6A:
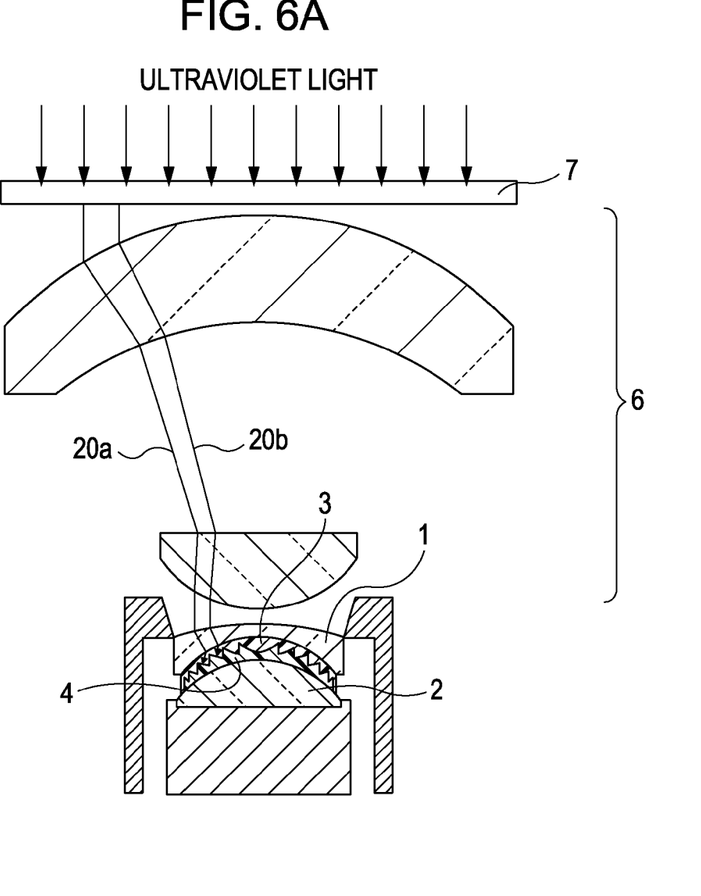
FIGS. 6A and 6B are cross-sectional views showing a method of applying light to a diffractive optical element according to a first embodiment.
Figure 6B:
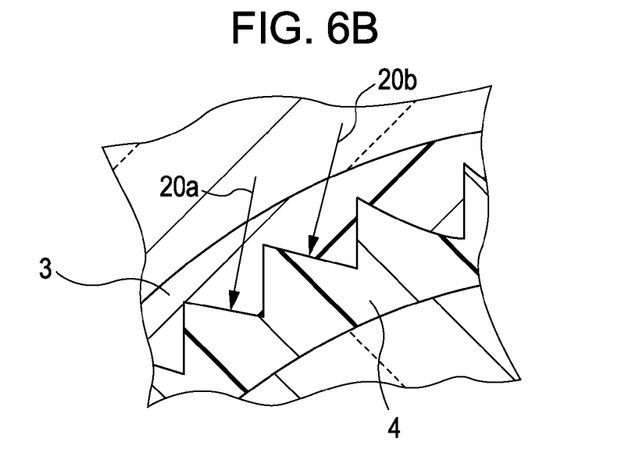

FIG. 6A is a cross-sectional view showing in detail the step of applying ultraviolet light to the photo-curable resin material 4a shown in FIG. 5D, and FIG. 6B is a cross-sectional view showing in detail the substantial part thereof. A lens unit 6 is arranged above the second glass lens substrate 2. Ultraviolet light applied is refracted by the lens unit 6 and enters the diffraction grating in a direction substantially perpendicular to the inclined surfaces 11 over the entire region of the diffraction grating shape. In FIG. 6B, reference numerals 20a and 20b represent ultraviolet light paths, which enter different inclined surfaces 11 in the substantially perpendicular direction. The lens unit 6 is designed in consideration of the refractive index distributions described with reference to FIGS. 1A to 1D. In the laminated diffractive optical element 10 according to this embodiment, the inclination angles of the inclined surfaces 11 gradually vary from the center toward the periphery of the laminated diffractive optical element 10. Therefore, lenses used in the lens unit 6 contain aspherical components.

An ultraviolet light lamp has an emission spectrum over a wide wavelength band from ultraviolet to visible regions. Since the wavelength region that causes a curing reaction of the photo-curable resin material 4a is wide at 250 to 400 nm, the wavelength region of light used for curing is limited to 360 to 370 nm by a UV-bandpass filter 7. The reason for this is that since the lens unit 6 includes refractive lenses, the refractive index of the glass material of the lens unit 6 varies depending on the wavelength of light incident on the lens unit 6, and light rays of a plurality of wavelengths are applied at different incident angles.

The lens unit may be designed such that ultraviolet light is applied substantially perpendicularly to all the inclined surfaces 11, as described above. In such a case, the state shown in FIGS. 1B and 2A is brought about. However, depending on the shape of the diffraction grating, there may be a case where it is difficult to apply ultraviolet light perpendicularly to all the inclined surfaces 11 in terms of optical design. In such a case, with respect to all the inclined surfaces 11, the incident angle of ultraviolet light to be applied should be at least deviated from the apex formed by the inclined surface 11 and the wall surface 12 toward the inclined surface 11 side. That is, it is important that all the inclined surfaces 11 are not in the state shown in FIGS. 1C and 2B.

Furthermore, in the step of applying ultraviolet light to the photo-curable resin material 3a shown in FIG. 4D, as in the case shown in FIGS. 6A and 6B, a lens unit is used so that ultraviolet light is applied perpendicularly to the inclined surfaces 11. However, the photo-curable resin material 3a does not have fine metal particles dispersed therein, and therefore is not greatly affected by the refractive index distribution, and it may not be necessary to add a lens unit.

Figure 7A:
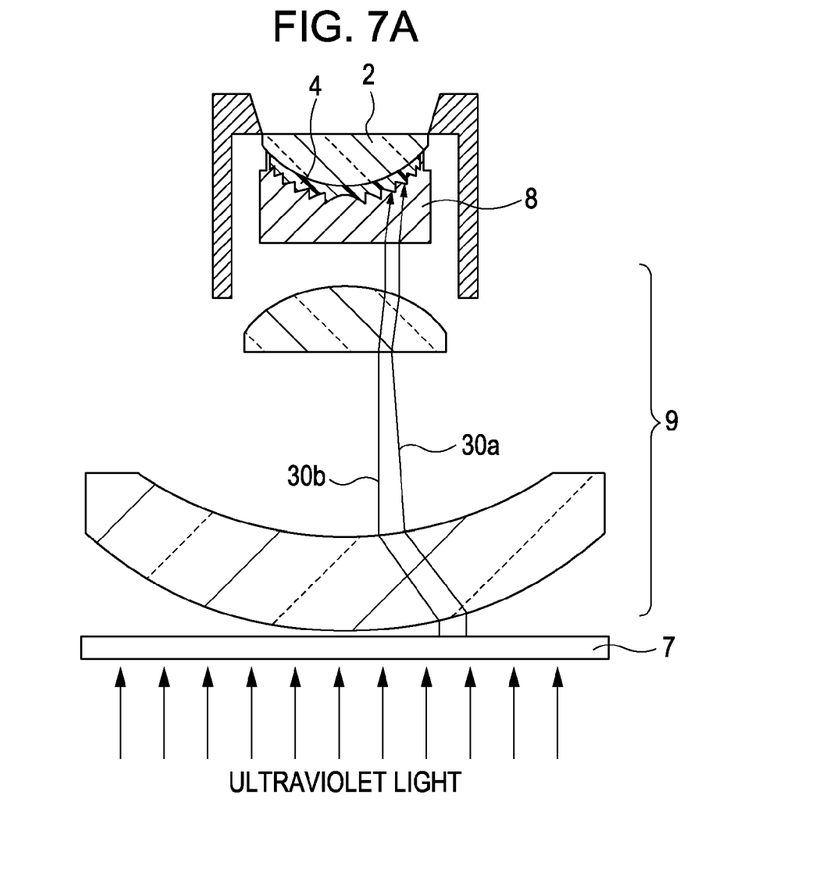
FIGS. 7A and 7B are cross-sectional views showing a method of applying light to a diffractive optical element according to a second embodiment.
Figure 7B:
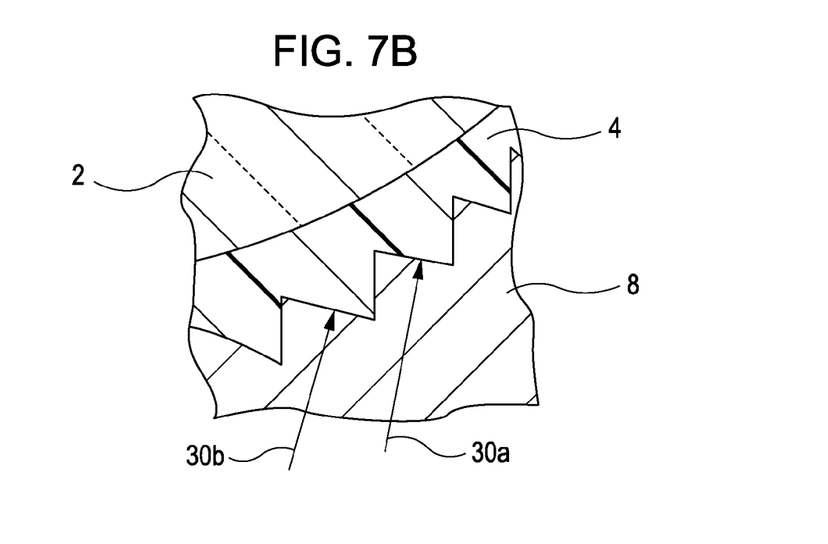

In the first embodiment, ultraviolet light is applied to the photo-curable resin material 3a through the first glass lens substrate 1, and ultraviolet light is applied to the photo-curable resin material 4a through the first glass lens substrate 1. In a second embodiment, as shown in FIG. 7A, by using a material that transmits ultraviolet light for a molding die 8, it is possible to cure the photo-curable resin material 4a from the molding die 8 side. FIG. 7B is a cross-sectional view showing the substantial part of FIG. 7A. In FIGS. 7A and 7B, reference numerals 30a and 30b represent ultraviolet light paths, which enter different inclined surfaces 11 in a direction perpendicular to the inclined surfaces. As for the molding die 8, it is possible to use a master composed of a UV-curable curable resin containing methacrylate as a major component in which a NiP plating layer is machined into a grating shape in advance. In this case, a lens unit 9 is designed such that ultraviolet light enter all the inclined surfaces 11 of the resin material 4 in the perpendicular direction.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-314210 filed Dec. 10, 2008 and No. 2009-239394 filed Oct. 16, 2009, which are hereby incorporated by reference herein in their entirety.

What is claimed is:

1. An element comprising:
   a glass lens substrate; and
   a resin layer composed of a photo-curable resin disposed on the glass lens substrate, the resin layer having a diffraction grating shape including a plurality of inclined surfaces and wall surfaces,
   wherein the refractive index of the resin layer varies depending on a thickness of the resin layer, and a direction of refractive-index variation is substantially perpendicular to the inclined surfaces.

2. The element according to claim 1, wherein the resin layer is composed of a fluororesin in which fine metal particles are dispersed.

3. An element comprising:
   a glass lens substrate; and
   a resin layer composed of a photo-curable resin disposed on the glass lens substrate, the resin layer having a diffraction grating shape including a plurality of inclined surfaces and wall surfaces,
   wherein the refractive index of the resin layer varies depending on a thickness of the resin layer with respect to all the inclined surfaces of the diffraction grating shape, and a direction of refractive-index variation is substantially perpendicular to the inclined surfaces or deviated from the perpendicular direction toward a thinner portion of the resin layer with respect to each inclined surface.

4. The element according to claim 3, wherein the resin layer is composed of a fluororesin in which fine metal particles are dispersed.

5. An element comprising:
   a first glass lens substrate;
   a second glass lens substrate; and
   a first resin layer and a second resin layer disposed and laminated between the first glass lens substrate and the second glass lens substrate, the first resin layer and the second resin layer each being composed of a photocurable resin, a boundary surface between the first resin layer and the second resin layer having a diffraction grating shape including a plurality of inclined surfaces and wall surfaces, wherein the refractive index of the second resin layer varies depending on a thickness of the resin layer with respect to all the inclined surfaces of the diffraction grating shape, and a direction of refractive-index variation is substantially perpendicular to the inclined surfaces or deviated from the perpendicular direction toward the thinner portion of the resin layer with respect to each inclined surface.

6. The element according to claim 5, wherein the second resin layer is composed of a fluororesin in which fine metal particles are dispersed.

* * * * *